United States Patent [19]
Walden

[11] Patent Number: 5,857,312
[45] Date of Patent: Jan. 12, 1999

[54] THERMAL PROCESSING METHOD AND APPARATUS FOR USE WITH PACKAGING CONTAINERS

[75] Inventor: Richard Geoffrey Walden, Faringdon, United Kingdom

[73] Assignee: CarnaudMetalbox (Holdings) USA Inc., Wilmington, Del.

[21] Appl. No.: 817,248

[22] PCT Filed: Oct. 11, 1995

[86] PCT No.: PCT/GB95/02407

§ 371 Date: Aug. 11, 1997

§ 102(e) Date: Aug. 11, 1997

[87] PCT Pub. No.: WO96/11592

PCT Pub. Date: Apr. 25, 1996

[30] Foreign Application Priority Data

Oct. 13, 1994 [GB] United Kingdom .................. 9420650

[51] Int. Cl.$^6$ .................................................. B65B 1/22
[52] U.S. Cl. ............................... 53/432; 53/440; 53/525; 53/127
[58] Field of Search ........................... 53/440, 437, 127, 53/525, 425; 366/218, 240

[56] References Cited

U.S. PATENT DOCUMENTS

| | | | |
|---|---|---|---|
| 1,682,814 | 9/1928 | Trifelos | 53/127 |
| 1,709,175 | 4/1929 | Huygen . | |
| 2,052,096 | 8/1936 | Kronquest | 259/59 |
| 2,062,331 | 12/1936 | Page et al. | 53/20 |
| 2,119,346 | 5/1938 | Page et al. | 126/272 |
| 2,134,817 | 11/1938 | Gerber | 126/272 |
| 2,748,005 | 5/1956 | Baier | 53/440 |
| 3,342,009 | 9/1967 | Anderson | 53/440 |
| 3,516,218 | 6/1970 | Eisler | 53/440 |
| 3,650,088 | 3/1972 | Wilson | 53/127 |
| 4,667,454 | 5/1987 | NcHenry et al. | 53/440 |
| 4,748,816 | 6/1988 | Arfert et al. | 62/63 |
| 4,832,965 | 5/1989 | Helin | 53/440 |

FOREIGN PATENT DOCUMENTS

| | | |
|---|---|---|
| 082 228 | 6/1983 | European Pat. Off. . |
| 2 096 516 | 6/1971 | France . |
| 2 342 670 | 11/1977 | France . |
| 2 031 822 | 12/1971 | Germany . |
| 56-21584 | 2/1981 | Japan . |
| SU-830317 | 5/1981 | Japan . |
| SU1773548 | 11/1992 | Japan . |
| 1 441 701 | 7/1976 | United Kingdom . |
| 1 593 962 | 7/1981 | United Kingdom . |

*Primary Examiner*—James F. Coan
*Assistant Examiner*—Gene L. Kim
*Attorney, Agent, or Firm*—Woodcock Washburn Kurtz Mackiewicz & Norris LLP

[57] ABSTRACT

A process for thermally treating a product in a container having a headspace above the product, in which the container is subjected to a heated or cooled environment and is simultaneously agitated. The acceleration to which the container is subjected by the agitation is of sufficient magnitude to cause the process to operate in a regime in which the heating or cooling time required for the product to reach a predetermined temperature is very substantially reduced and moreover is substantially insensitive to changes in the acceleration.

33 Claims, 5 Drawing Sheets

THERMAL PROCESSING METHOD AND APPARATUS FOR USE WITH PACKAGING CONTAINERS

BACKGROUND OF THE INVENTION

The invention relates to methods and apparatus for thermally processing packaging containers, in particular (but not exclusively) metal cans containing a food product for human or animal consumption.

In a normal canning process the food product is filled into empty cans to an appropriate level, leaving a headspace above the product, the open ends of the cans are hermetically sealed with end closures, and then the cans and their contents are sterilised by means of heat. The heating medium used is normally either steam or hot water at a temperature usually of between 115° C. and 130° C. To achieve this temperature the steam or hot water has to be held at a superatmospheric pressure, and accordingly it is contained in a pressure vessel known as a retort or cooker.

The cans, after filling and closing, are placed in the retort, the retort is closed, and steam or water is introduced. Temperature controllers are usually present on the retort to maintain the heating medium at the desired temperature. While the cans are located in the retort, heat from the heating medium is conducted through the container walls and thence passes into the product.

Insofar as their behaviour during thermal sterilisation is concerned, food products are usually classified into three categories, namely: (1) those that heat largely by convection, (2) those that heat largely by conduction, and (3) those that heat by substantial parts each of conduction and convection. Food products having a very thin consistency heat largely by convection, that is to say, the heating process generates convection currents in the product and these currents disperse the heat throughout the pack; products of this kind fall into category 1. Thick, e.g. relatively viscous or partly particulate, products, heat largely by conduction; for them no significant movement within the container occurs, and so heat can substantially only be transferred by conduction; these products form category 2. The products falling within category 3, which heat by both conduction and convection, form the smallest of the three categories and include those products which either thicken or become substantially more fluid as heating progresses.

Because of the need for complete sterilisation all parts of the food product in a can must reach a sufficient temperature for a long enough time to achieve so-called commercial sterility. With non-acid (pH>4.5) products which heat largely by convection (i.e. category 1 products) this occurs fairly quickly; for example, a cylindrical can of 73 mm diameter and 110 mm length typically takes 15–20 minutes in a retort at 121° C. to heat to sterilisation temperature ("heat-up time") and remain at that temperature for as long as may be necessary to achieve commercial sterility ("dwell time"). The 15–20 minute period, thus made up of the heat-up time and any dwell time of the can in the retort at sterilisation temperature, is commonly referred to as the "process" time, which nomenclature will be used hereafter. The process time is subsequent to any time which may be allowed for the retort itself to heat to sterilisation temperature, hereinafter referred to as the "come-up" time. The come-up time may be considerable, e.g. up to half hour, and some heating of the cans will occur during this time.

The time period formed of the heat-up time of the cans and any come-up time of the retort is significant in the context of the present invention because it represents the time during which the product in the cans is being heated to the sterilisation temperature by heat passing through the can wall. This time period, hereinafter referred to as the "heating" time (of the cans), may be supplemented by any dwell time to form the total time during which the cans are subjected to the heating medium and which accordingly is hereinafter referred to as the "sterilisation", or more generally, "thermal treatment" time.

It will be seen that, using the definitions given above, the sterilisation time is equal to the process time plus any come-up time; it is also equal to the heating time plus any dwell time.

Category 2 products require much longer heating times than category 1 products because of their lesser mobility; a can as described above but charged with a category 2 product may typically have a process time of 80–90 minutes at 121° C., and to this must be added any retort come-up time allowed and, in addition, the time required for the hot and sterile can to cool to a predetermined temperature at which it may safely be removed from the retort. This latter time duration is hereinafter referred to as the "cooling" time of the can. Thus the total time required by the complete sterilisation cycle, i.e. from admission of the heating medium to the end of cooling, may be 2 hours or more; this overall time is hereinafter called the "total cycle time".

The long heating times required by category 2 packs (in particular) often lead to overcooking of the product, especially where it lies adjacent to the container wall. In commercial practice it is already well known to reduce the heating time and possible overcooking of a category 2 food product in a static retort by agitating the can by rotating it whilst in the retort. The rotation of the can has been either about its cylindrical axis, or "end-over-end" about a transverse (diametral) axis through its centre. The first form of agitation can be generated by rolling cans of circular section about their longitudinal axis, and is used in "Reel" and "Spiral" cookers; however, it is well recognised that it does not induce efficient mixing, and the required process times are reduced by a factor of only about 2. 'End-over-end' rotation induces better mixing, and reduction factors in process time of of 3 or 4 can be expected.

In addition to the commercially used methods described above there are proposals in the patent literature for achieving process time reductions by agitation. These proposals have variously employed vertical or horizontal reciprocation (i.e. back-and-forth movement along a substantially straight path), or angular movement, possibly with reversals, along a circular path, or compound movement having both reciprocating and angular components.

By way of example, vertical reciprocation is featured in U.S. Pat. No. 1,709,175 and German Patent Publication 2031822, whilst horizontal reciprocation is featured in U.S. Pat. Nos. 2,052,096 and 2,134,817, and Japanese Patent Publication JP 56-21584. Angular movement is featured in GB Patent Specification 1593962 at FIGS. 12, 13 and at FIGS. 14, 15, whilst compound movement is featured in FIGS. 16, 17 of GB 1593962 and in French Patent Publication 2096516.

Whilst these and other proposals in the patent literature might be expected to achieve useful reductions in process time with the attendant advantages, they contain no indication that the severity of the agitation is important and, moreover, the maximum acceleration given to the container must exceed a certain minimum value if the process is to be reliably reproducible whilst achieving high levels of process time reduction.

For example, in the process particularly described in U.S. Pat. No. 2,134,817 above, the amplitude of the horizontal reciprocating movement between limiting positions (i.e. the peak-to-peak or double amplitude) is said to be usually less than one inch, and the reciprocation frequency is said to be in the neighbourhood of 140 times (i.e. cycles) per minute.

Assuming a sinusoidal waveform for the reciprocation, these parameter values given for the process of U.S. Pat. No. 2,134,817 correspond to a maximum value of acceleration of approximately 0.3 times that due to gravity (i.e. 0.3 g). As is manifest, however, from the accompanying graphs showing the results of tests made by the present Applicants, horizontal reciprocation using accelerations of this magnitude stands only to achieve a reduction of heating times (in relation to the same process without reciprocation) which is little or no better than the reduction which is commonly achieved by the commercially practiced methods described above in which the cans are rotated either about their longitudinal axes or end-over-end. Moreover, and as will be discussed more fully later, our tests have indicated that the process described in U.S. Pat. No. 2,134,817 will be subject to wide random variations, and as a result the sterilisation times which would be required in practice to ensure commercial sterility using that process would have to be made considerably greater than the sterilisation times which can be achieved.

As mentioned above, in the proposal of U.S. Pat. No. 2,134,817 the cans are reciprocated horizontally. Comparative tests performed by the present Applicants have shown that horizontal reciprocation offers more efficient and more uniform product mixing of Category 2 food products than does vertical reciprocation, and for this and other reasons horizontal reciprocation is preferred. For some containers, for example, cylindrical cans which are longer than they are wide, it is advantageous for them to be generally aligned with the reciprocation path. For other containers, however, —for example, squat cylindrical cans—it may be preferred for them to be orientated differently in relation to the reciprocation path.

The present invention seeks to provide significant and consistent reductions in the heating time of a product in a container in a thermal treatment process, particularly (but not necessarily) a sterilisation process, and accordingly provides, in accordance with a first aspect thereof, a process for thermally treating a product in a container having a headspace above the product, in which the container is subjected to a heated environment and is simultaneously agitated, characterised in that the acceleration to which the container is subjected by the agitation is of sufficient magnitude to cause the process to operate in a regime in which the heating time required for the product to reach a predetermined temperature is very substantially reduced and moreover is substantially insensitive to changes in the acceleration. Preferably the acceleration is such that the heating time of the product is reduced by at least 90% and has a gradient of at most 1 min per g of acceleration.

The invention may also advantageously be used for reducing the cooling time of a product in a container from an elevated temperature to a predetermined lower temperature which may be near or equal to ambient temperature. In accordance with a second aspect thereof the invention accordingly provides a process for cooling a hot product in a container having a headspace above the product, characterised in that the container is subjected to a cooled environment and is simultaneously reciprocated with an acceleration of sufficient magnitude to cause the process to operate in a regime in which the cooling time required for the product to reach a predetermined temperature is very substantially reduced and moreover is substantially insensitive to changes in the acceleration. Preferably the acceleration is such that the cooling time of the product is reduced by at least 90% and has a gradient of at most 1 min per g of acceleration. Usually the product is thermally treated by a process as defined in the preceding paragraph, and, subsequent to the thermal treatment, is cooled to a lower temperature by the process forming this second aspect of the invention.

The word "headspace" as used above generally has the meaning which is conventional in the food canning industry, that is to say, it denotes the distance by which the surface of the product in the can falls short of the top free edge of the can at the end of the product filling operation but before the closure is seamed into position to close the can. In the remainder of the specification and claims this headspace is hereinafter referred to as the "gross headspace", in order to differentiate it from the actual headspace existing in the can after the end closure has been attached. The latter form of headspace, hereinafter referred to as "net headspace", is smaller than the gross headspace by about 3 mm. Thus, for example, a gross headspace of 12 mm may be considered to correspond to a net headspace of 9 mm, one of 8 mm to a net headspace of 5 mm, and one of 4 mm to a net headspace of 1 mm.

DESCRIPTION OF THE PREFERRED EMBODIMENT

Figure 1:
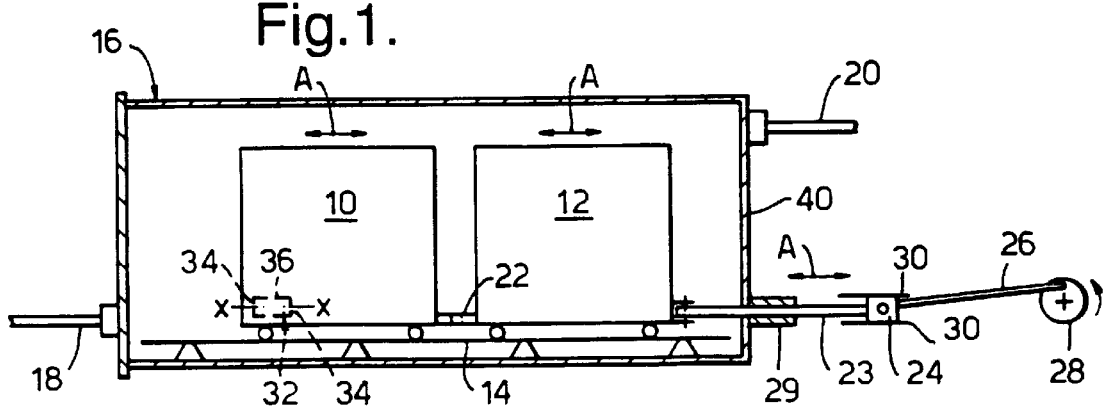
FIG. 1 is a diagrammatic depiction of an apparatus for practicing the invention.

A method in accordance with the invention for thermally sterilising a packaging container and/or subsequently cooling it to removal temperature may be performed in an otherwise conventional retort of the kind commonly referred to as "batch" by arranging either for the container to reciprocate in relation to the retort or for the retort to reciprocate and the container to move with it. FIG. 1 diagrammatically shows an arrangement of the former kind, in which cylindrical food cans are loaded into wheeled crates 10, 12 which are capable of horizontal reciprocating movement on a track 14 within the thermal enclosure 16 of a horizontal batch retort. Superheated steam or water (not shown) at a temperature typically of between 120° C. and 130° C. can be supplied to the thermal enclosure in conventional manner, such as by input and exhaust connections 18, 20.

The crates are coupled together in series by a coupling 22, and a horizontal drive rod 23 extends from crate 12 through an end wall 40 of the thermal enclosure 16, and is attached via a connection block 24 and connection rod 26 to a crank 28. The crank in turn is coupled to a motor (not shown), and drives the drive rod 23, and thereby the crates 10, 12, to reciprocate horizontally within the enclosure 16 with a cyclic movement of substantially sinusoidal form. The position, velocity and acceleration of the cans in the crates accordingly each vary with time in a substantially sinusoidal manner.

Accurate alignment of the drive rod 23 with its axis of movement is assured at all times by a bearing block 29 on the thermal enclosure 16, and horizontal guides 30 between which the connection block 24 is located for movement.

As is represented in FIG. 1 by one can 32, the food cans to be thermally processed are of right-cylindrical form with end panels 34 perpendicular to their axes. Depending on the method of manufacture of the can, one or both of the end panels may be formed separately from the cylindrical can body 36. For example, one of the end panels 34 may be a separately formed and attached end closure of the "easy-opening" variety, the other end panel being formed integrally with the body 36. In another type of can, both end panels 34 are separately provided by end closures of which one is attached before, and the other after, product filling.

As is apparent for the can 32 which is individually shown, the cans are loaded into the crates 10, 12 with their axes XX horizontal and aligned or parallel with the drive rod 23. Reciprocation of the drive rod produced by the associated motor during the sterilisation process may then cause corresponding reciprocation of the cans along their longitudinal axes, as is indicated by the double-ended arrows A. It will therefore be understood that the reciprocation is normal to the planes of the end panels 34.

After the can contents have reached their sterilisation temperature, i.e. the temperature of the heating medium, they are held in the retort for as long as is necessary to achieve commercial sterility; the supply of heating medium to the retort is maintained during this time. The heating medium is then replaced by a coolant, e.g water at 20° C., and the cans are cooled to a temperature at which they may safely be removed from the retort. Usually they are still at an above-ambient temperature at this time, 40° C. being typical. After removal the cans are carried away for drying, labelling (if necessary), palletising and despatch.

For a commercial process Applicants prefer for the agitation of the cans mentioned above to be maintained throughout the whole sterilisation cycle, most especially when the cans are being heated to, and cooled down from, the sterilisation temperature, that is to say, during the heating and cooling times respectively; agitation of the cans when at their sterilisation temperature (i.e. during any dwell time) may be of only marginal benefit, but is preferred for process continuity.

The potential effect of agitation on heating and cooling times was investigated by Applicants by means of tests which were performed on conventional, generally cylindrical, metal food cans using an apparatus arranged generally as shown in FIG. 1. The results of those tests are represented graphically in FIGS. 2 to 8 for heating, and FIG. 9 for cooling. In all the tests the cans had a height (i.e. axial length) of 110 mm, a body diameter of 73 mm, and a body wall thickness of 0.17 mm. The cans were charged with a slurry of bentonite in water to simulate the food product, the bentonite content of the mixtures being varied (as will become apparent) in order to simulate products of different viscosity. In each can a net headspace was left above the product, and thermocouples were located in the product and connected to a measuring and data logging equipment. The thermocouples and their associated equipment were conventional, and are therefore not shown or described.

Each one of FIGS. 2 to 8 shows the result of a series of six related tests performed on cans having the same net headspace and bentonite content. In the series of tests depicted in each of FIGS. 2 to 6 the cans tested had an approximately 9 mm net headspace; they were charged with slurries having bentonite contents of 5%, 7%, 8%, 9% and 10% respectively. These can all be considered to correspond to category 2 food products, that is, products which heat (and cool) largely by conduction. The tests of FIGS. 7 and 8 were performed on cans having a 7% bentonite content, respectively with net headspaces of approximately 5 mm and 1 mm; they can therefore be usefully compared with FIG. 3, in which the bentonite content was the same (7%).

Slurry having a 7% bentonite content has a viscosity which is typical of many food products which are encountered in the food processing industry. A net headspace of 9 mm is also typical of such products, and FIG. 3 was accordingly and appropriately used for the purposes of the detailed description which follows; however, it should be understood that the description applies to each of FIG. 2 and FIGS. 4 to 6 except where specifically stated.

Figure 3:
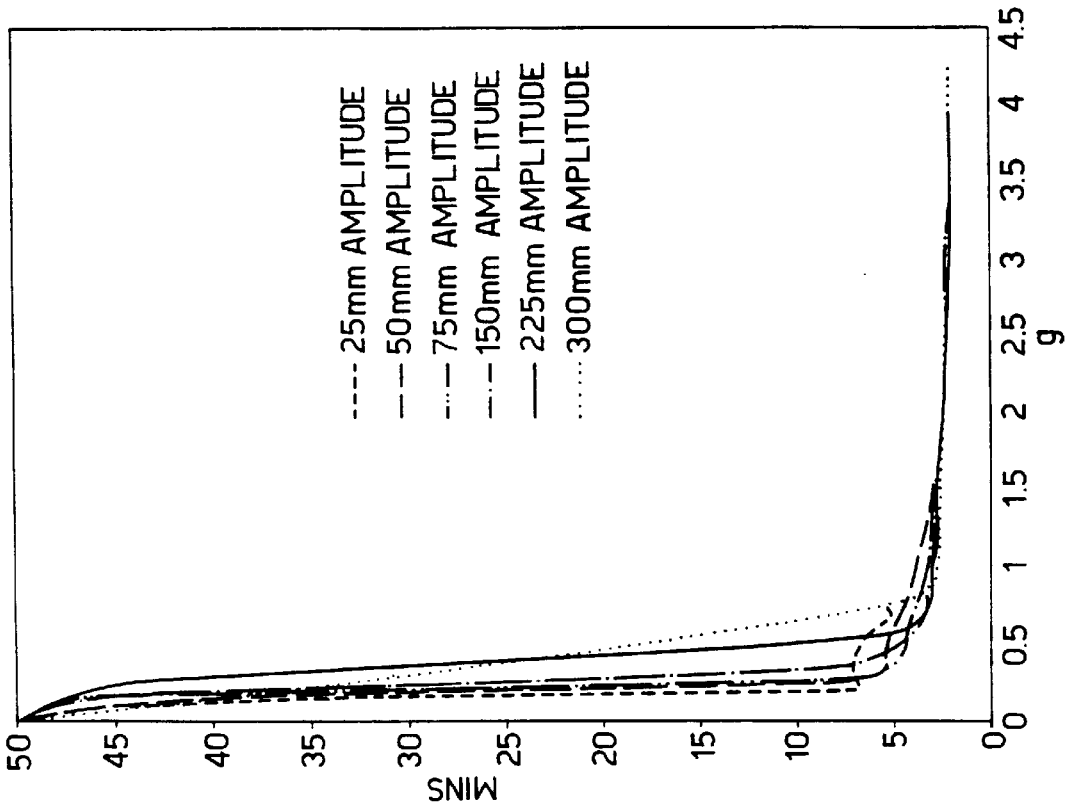

FIG. 3 shows graphically how the time taken for the simulated product to achieve a predetermined temperature (120° C.) which could be regarded as typical for a commercial sterilisation process was found to vary with the (maximum) acceleration to which the can was subjected by the agitation performed. Six different graphs are shown, for six different peak-to-peak amplitudes of the reciprocating movement; it should be understood that by changing the speed of the drive motor the frequency of oscillation was changed in accordance with the six different amplitudes so as to achieve the required values of maximum acceleration given along the 'X' axes of the graphs. For consistency with the remainder of the specification and claims the time taken to achieve the predetermined temperature is again referred to as the "heating time", although it should be understood that in order to increase the accuracy (and reduce the duration) of the experiments the temperature of the heating medium admitted to the retort was made somewhat greater (130° C.).

From FIG. 3 it is evident that the heating time at zero acceleration, i.e. without any agitation, was approximately 50 minutes, and that for each of the six peak-to-peak amplitudes used, namely 25 mm, 50 mm, 75 mm, 150 mm, 225 mm and 300 mm, the heating time fell sharply as the acceleration was initially increased from this value. For accelerations of between zero and about 1 g, that is the acceleration due to gravity, the graphs had large gradients and the heating times required were found to be subject to very substantial random variation. Thus, whilst reductions in the required heating time were possible, in general they were relatively small; moreover, we believe that the high degree of inconsistency which could be expected within this range of accelerations would in commercial practice require substantially longer heating times to be used than were achieved experimentally; otherwise, there would be the risk of occasional, but commercially unacceptable, incomplete sterilisation of the food product in a can. The potential benefit to be obtained by use of accelerations within this unstable operating regime is therefore not only limited but also less than it might appear, and it is to be noted that this regime includes the values of acceleration which were specifically proposed in the patent specification Nos. 2134817 and JP 56-21584 mentioned above.

FIG. 3 further illustrates that as acceleration was increased beyond the initial unstable regime the graphs flattened out sharply and converged at an elbow which corresponded to an acceleration in the region of 1 g. Beyond the elbow the graphs had a narrow range of values of heating time of between 2 and 3¼ minutes, that is to say, less than 10% of the heating time without agitation. Moreover, whilst the heating times required continued to fall with increasing acceleration, the gradients of the graphs were very much smaller than before and at most one minute (of heat-up time) per g (acceleration due to gravity); the heating times were therefore substantially insensitive to changes in the acceleration. Applicants found that the test results were uniform and could be accurately replicated; thus, not only were the potential reductions in heating time greater than for accelerations within the unstable region, but also those potential reductions could be achieved repeatedly and with a high degree of confidence. In accordance with the invention therefore, Applicants propose that a sterilisation or other thermal treatment of a food product in a can should be accompanied by agitation of sufficient intensity that the process is conducted within this stable operating regime.

It will be apparent from FIG. 3 that accelerations of from about 1¼ g and above are suitable for a sterilisation process performed on a food product having a viscosity equivalent to that of a 7% bentonite slurry and a 9 mm net headspace. A preferred range is 1½ g–2½ g. Values of acceleration above 2½ g would appear to offer little or no significant additional benefit in the reduction of heating time, but may raise problems of a mechanical nature because of the high inertial forces which are involved.

Figure 2:
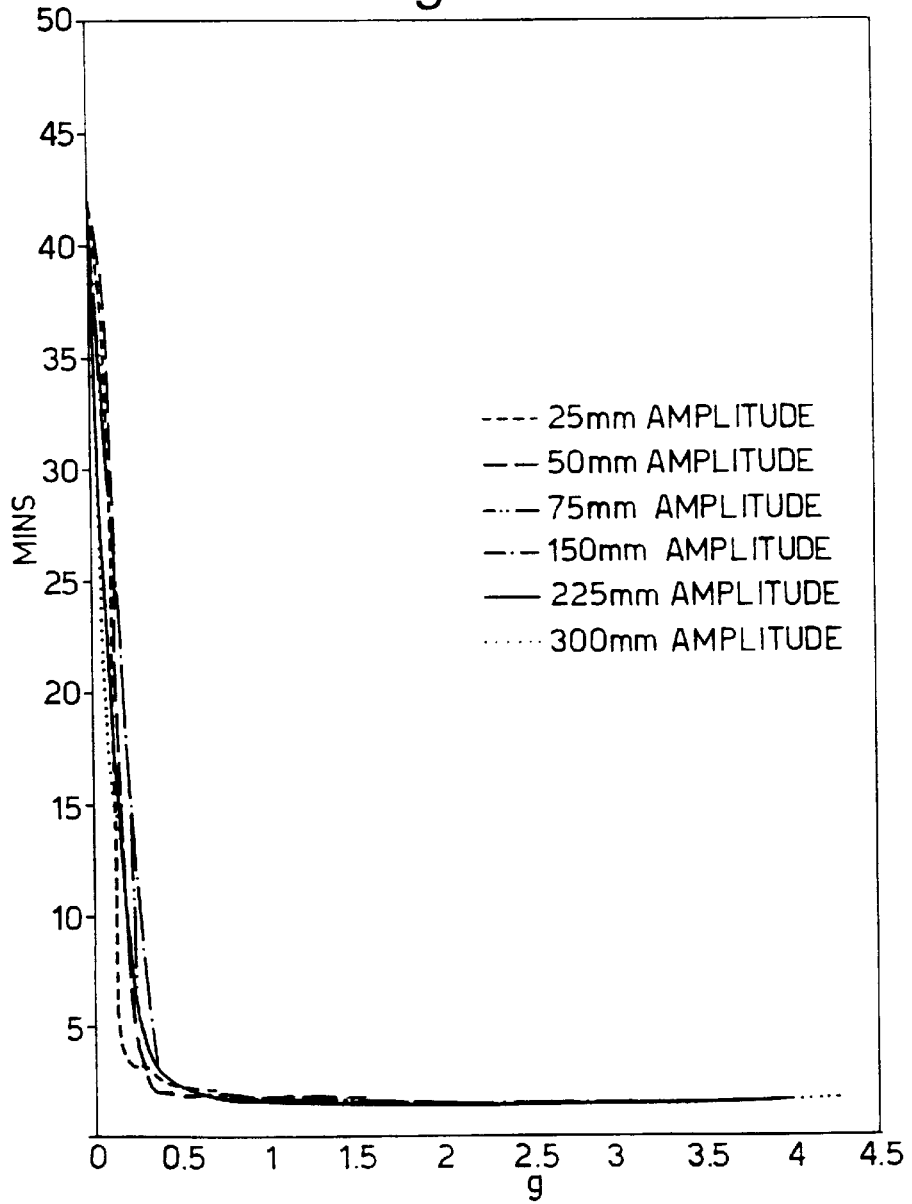
FIGS. 2 to 6 are graphs of time, in minutes, versus acceleration amount, in g's, showing the results of heating tests performed on cans having a 9 mm headspace and slurries with bentonite contents of 5%, 7%, 8%, 9%, and 10%, respectively.

FIG. 2 shows graphs corresponding to those discussed above in relation to FIG. 3 but with a 5% bentonite slurry corresponding to a food product of relatively thin consistency and low viscosity. Using the criteria given above, the use of accelerations of ¾ g and above is indicated, accelerations within the range 1 g to 2 g being preferred. It will be seen that the heating time lies within the range of about 1½ mins. to about 2½ mins, i.e. again less than 10% of the heating time without agitation. Also, the gradient of the graphs within this stable region is small, and at most 1 min/g.

Figure 4:
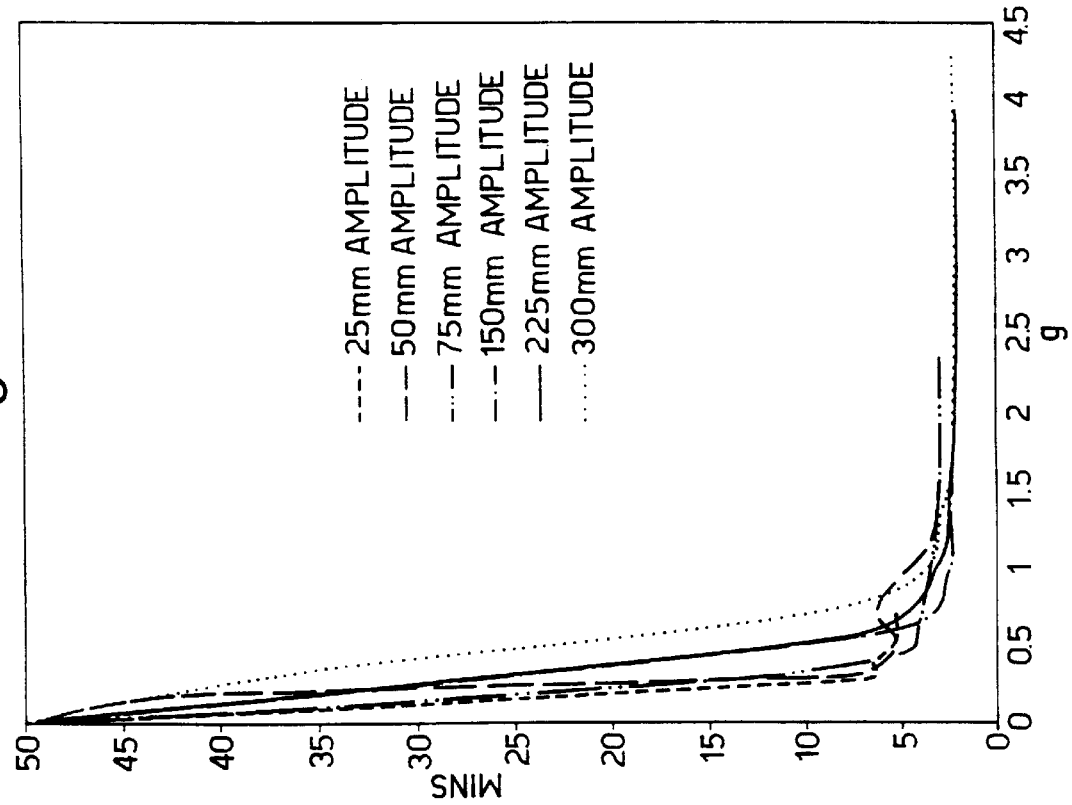
Figure 6:
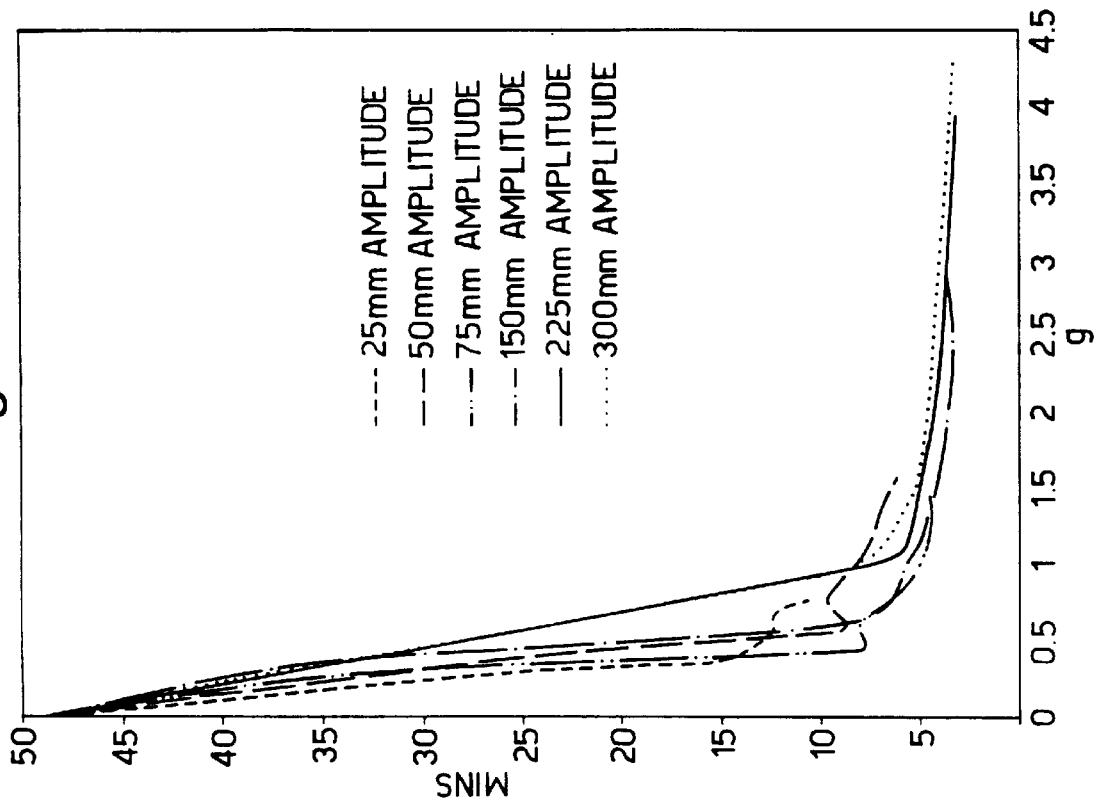
Figure 5:
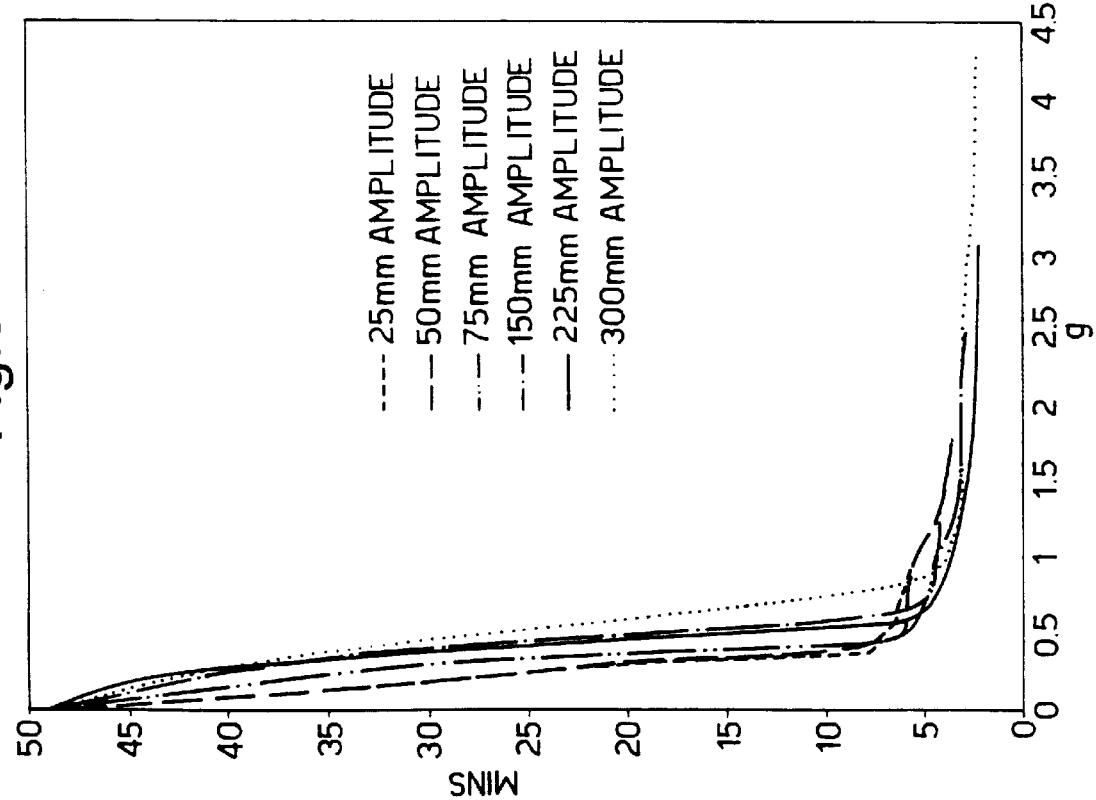

FIGS. 4 to 6 show the results of a series of tests similar to that of FIG. 3 but using simulated food products of 8%, 9% and 10% bentonite content respectively. A minimum value of the acceleration of about 1¼ g is indicated for FIGS. 4 and 5 and about 1½ g for FIG. 6, accelerations within the range 1½ g–2½ g and 1¾ g–2½ g respectively being preferred. The gradient of the graphs within the stable region of operation is again 1 min/g at most for each test series. As with the tests previously described in each series, heating times less than 10% of the heating time without agitation were achieved.

It will be noted from FIGS. 2 to 6 that for the values of acceleration giving stable operation of the thermal treatment process the heating time tended to increase with increasing viscosity of the slurry being tested. However, reductions in heating time of more than 90% were available throughout the range of viscosities tested, and Applicants believe that, for the most common viscosities encountered in the food processing industry, reductions in heating time of 95% or more can be achieved.

It is also to be noted from FIGS. 2 to 6 that in some of the tests not all of the graphs reliably extended into the stable region of operation which forms the basis for the present invention. In the majority of cases this was because of limitations in the apparatus used for the tests. In particular, using peak-to-peak amplitudes of 25 mm and 50 mm, the apparatus was able to develop values of acceleration of only about ¾ g and 1½ g respectively; however, although they failed to provide any useful data for the stable region of process operation, these tests nevertheless showed that the unstable region discussed above again occurred with small amplitude/high frequency agitation.

Figure 7:
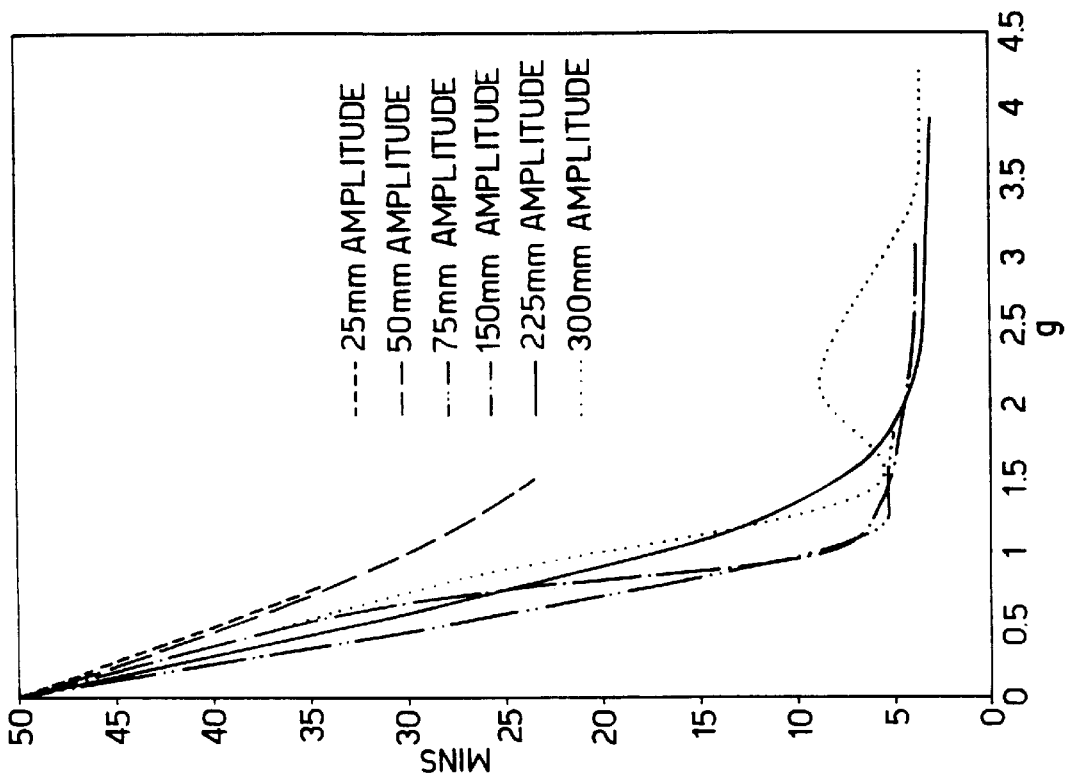
FIGS. 7 and 8 are graphs of time, in minutes, versus acceleration amount, in g's, showing the results of heating tests performed on cans having a 5 mm and a 1 mm headspace, respectively, and slurries with bentonite contents of 7%.
Figure 8:
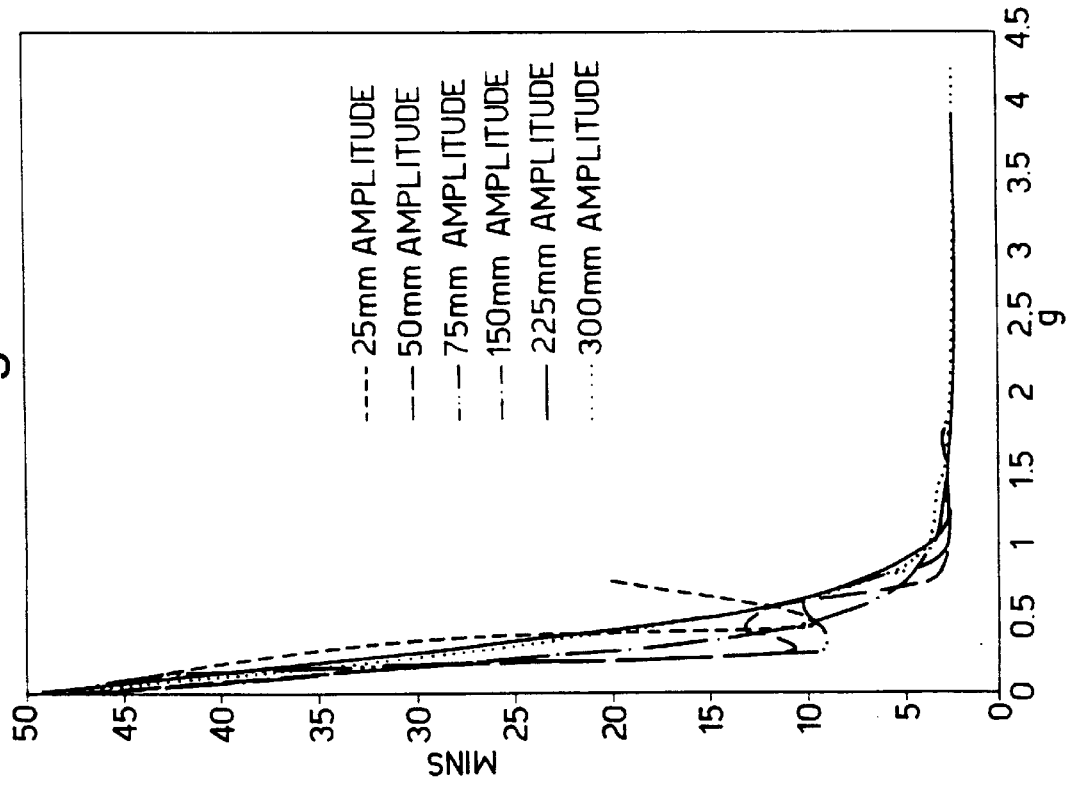

FIGS. 7 and 8 illustrate the effect of headspace reduction, showing series of tests on cans having 5 mm and 1 mm net headspace respectively. A 7% bentonite slurry was used to simulate the food product, the same six amplitudes being used as before. FIGS. 7 and 8 are accordingly directly comparable with FIG. 3.

The present invention relies for its effect upon movement of the food product in relation to the can which holds it, and a headspace sufficient to allow such movement to occur is therefore essential. FIG. 7 in comparison with FIG. 3 suggests that, in general, a reduction in net headspace of from 9 mm (FIG. 3) to 5 mm has little effect on the potential reductions in heating time which can be achieved using accelerations within the stable region of operation, and that headspaces within this regime can therefore safely be used for the purposes of the invention in a conventional metal can as previously described.

FIG. 8 suggests, however, that a net headspace of 1 mm does not provide sufficient room to allow adequate mixing of product within the can, at least for amplitudes at the extreme ends of the amplitude range used, it being seen that the results from amplitudes of 25 mm and 50 mm were invalid even for the limited acceleration range which they covered, and that for 300 mm was invalid until large (i.e. >5.5 g) values of acceleration were attained. Moreover, the unstable region of operation extended to higher values of acceleration than before. In this respect it should be noted that the net headspaces which are commercially used for food packing in cans lie within the range 2–10 mm. For cans having headspaces at the lower end of this range intermediate values of amplitude and acceleration such as 150 mm and 2¼ g seem to be appropriate. However, with suitable choice of the amplitude and acceleration used, reductions in heating time of at least 90% and gradients of at most 1 min/g are again possible.

By increasing the transfer of heat between the can wall and a product within the can, the invention can provide significant benefits not only in the heating of cans as described above, but also in their cooling from an elevated temperature. Usually such cooling of a can will follow a heating operation in which the invention is again used. For example, a can containing a food product may be heated to sterilisation temperature in a retort whilst being agitated in accordance with the teachings of the invention to reduce the heating time required; after sterilisation the can and its contents are cooled by cold water at, typically, 20° C. which is admitted to the retort whilst the retort is again agitated in accordance with the teachings of the invention so as to reduce the time required to cool the can to a lower temperature (typically 40° C.) at which it may safely be unloaded from the retort. By such use of the invention for both the heating-up and cooling-down parts of the sterilisation process, Applicants expect to reduce the total cycle time to typically less than one quarter of an hour for food products in category 2; usually, total cycle times of two or more hours would be required using static conventional sterilisation methods and apparatus.

Figure 9:
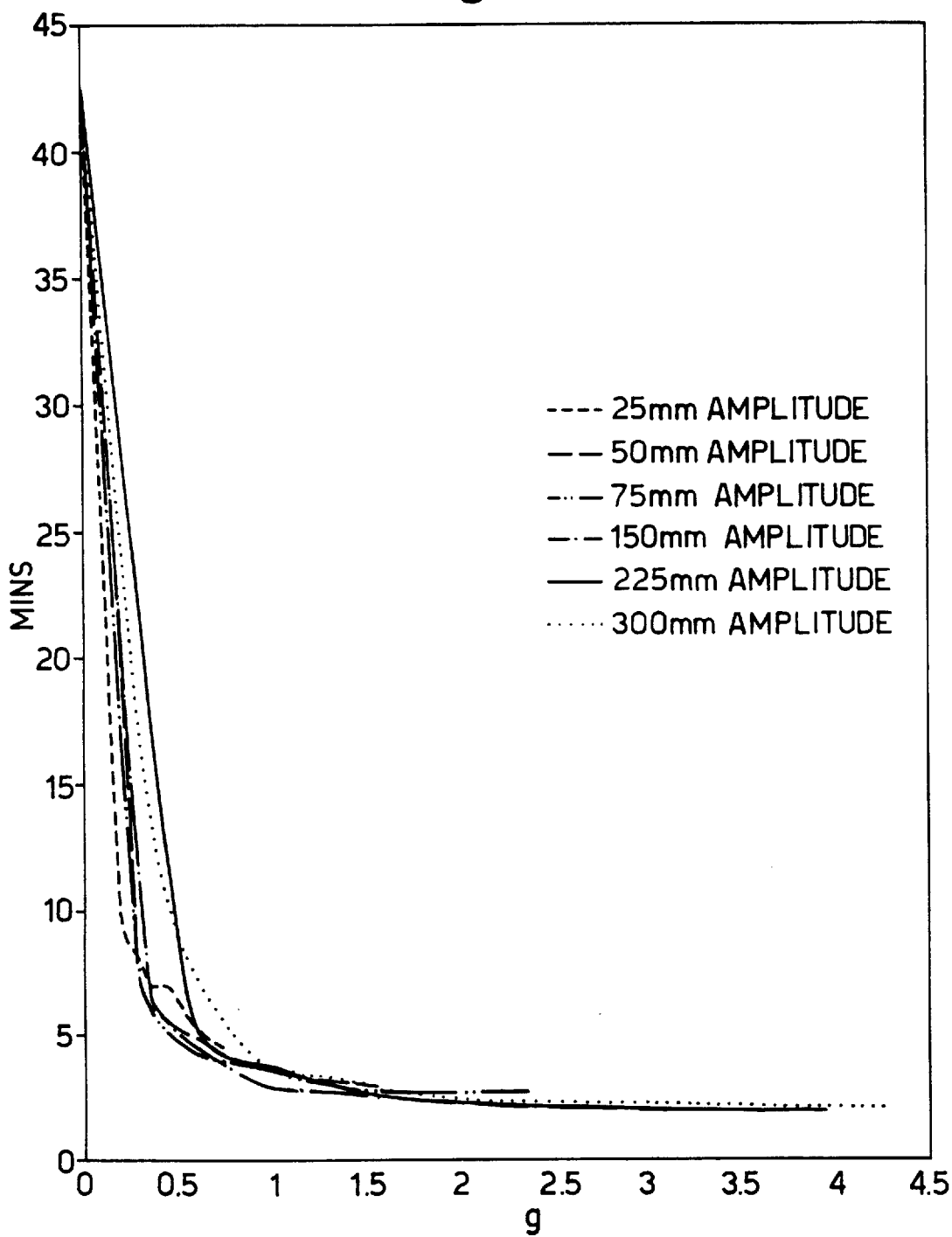
FIG. 9 is a graph of time, in minutes, versus acceleration amount, in g's, showing the results of cooling tests performed on cans having a 9 mm headspace and slurries with bentonite contents of 7%.

FIG. 9 illustrates use of the invention in relation to the cooling of cans of a food product from an elevated temperature such as is used for sterilisation. The same six amplitudes of agitation were used as before, and the cans tested had a 7% bentonite content and a 9 mm net headspace. In those respects FIG. 9 is therefore comparable with FIG. 3. The elevated temperature was 120° C. (corresponding to the final temperature achieved in the preceding tests), the temperature to which the cans were cooled being 40° C. From FIG. 9 it will be seen that the cooling times required for the product in the cans to achieve the required temperature reduction followed curves which were similar to those for the heat-up time in FIG. 3. Again, an unstable region of operation existed for accelerations below about 1 g, to be followed by a stable region of operation in which further increases in acceleration had little or no effect on the cooling times which were required; thus, the maximum gradient of 1 minute (of cooling time) per g of acceleration was again found to apply.

As with operation in a heating regime as previously discussed in relation to FIG. 3, the cooling treatment of FIG. 9 offered reductions in cooling time which were at least 90% of the cooling time required with no agitation (43 minutes). It will also be seen from FIG. 9 that a acceleration of about 1¼ g and above is appropriate, 1½ g–2½ g being preferred.

The reductions in heating time which can be achieved by use of the present invention are particularly beneficial for product quality; for example, Applicants believe that, because the overcooking of category 2 products (in particular) can be substantially avoided, it may be possible to pack in cans products for which criteria of product quality have hitherto caused in-container sterilisation to be dismissed as being unsuitable. The invention offers the possibility of significant cost benefits in e.g. capital equipment and energy; also, because it reduces or eliminates the danger of overcooking of product on the can wall, it enables higher retort temperatures to be used than hitherto, thereby further reducing the heating times required.

Whilst being of particular value for the sterilisation of food products in metal cans, the invention may be applied to thermal processes other than sterilisation, to products other than food products, and to containers other than cylindrical metal cans. In one possible application the invention is used for the sterilisation of food products in tray-like containers of a synthetic plastics resin material such as polypropylene or polyethylene terephthalate (PET). Also, the agitation of containers for the purposes of the invention may be other than horizontally directed and rectilinear, and may include a rotary component of motion. Any motion or component is preferably of sinusoidal waveform (position versus time), although other waveforms may be used. Particularly for cylindrical cans which are of large diameter in relation to their length it may be preferable to agitate them perpendicularly to their longitudinal axis.

The invention may have application to sterilisation on a continuous basis, rather than batch sterilisation as is illustrated in FIG. 1.

I claim:

1. A process for thermally treating a product in a container having a headspace above the product, in which the container is subjected to an environment heated to a predetermined heating temperature and is simultaneously agitated, wherein the minimum acceleration amount to which the container is subjected during the agitation is of sufficient magnitude to cause the process to operate in a regime in which the heating time required for the product to reach a predetermined processing temperature is (i) reduced by at least about 90% compared to the heating time required to reach the same predetermined processing temperature when subjected to an environment heated to the same environmental heating temperature but without agitation and (ii) substantially insensitive to increases in the magnitude of the acceleration amount.

2. A process according to claim 1 wherein, within the said regime the heating time of the product falls by at most 1 min per g of change in the acceleration.

3. A process according to claim 1, wherein within the said regime the heating time of the product falls by at most 1 min per g of increase in the acceleration amount.

4. A process according claim 1, wherein the agitation of the containers is substantially reciprocation thereof.

5. A process according to claim 4, wherein, the containers are metal cans and the reciprocation of the cans is perpendicular to one or more generally plane end closures thereof.

6. A process according to claim 1, wherein, the agitation of the container is substantially sinusoidal (position versus time).

7. A process for cooling a hot product in a container having a headspace above the product, wherein the container is subjected to a environment cooled to a predetermined cooling temperature and is simultaneously agitated with an acceleration amount of sufficient minimum magnitude to cause the process to operate in a regime in which the cooling time required for the product to reach a predetermined processing temperature is reduced by at least about 90% compared to the cooling time required reach the predetermined processing temperature when subjected to an environment cooled to the same cooling temperature but without agitation and moreover is substantially insensitive to increases in the magnitude of the acceleration amount.

8. A process according to claim 7 wherein within the said regime the cooling time of the product falls by at most 1 min per g of change in the acceleration.

9. Apparatus for subjecting a container of a product to a thermal treatment, the container having a headspace above the product, which comprises:

(1) enclosure means for providing an environment for the container during said thermal treatment;

(2) heating means for admitting a heating medium to said environment to heat the same to an environmental heating temperature;

(3) support means for supporting the container within the enclosure means;

(4) drive means for the container when supported by the support means; the drive means being arranged, while the heating means is effective to heat the environment for said thermal treatment, to agitate the container with an acceleration amount which is of sufficient magnitude to cause the thermal treatment to operate in a regime in which the heating time required for the product to reach a predetermined processing temperature is reduced by at least about 90% compared to the heating time required to reach said predetermined processing temperature at the same environmental heating temperature but without agitation and moreover is substantially insensitive to increases in the magnitude of the acceleration amount.

10. Apparatus for cooling a hot product in a container having a headspace above the product, which comprises:

(1) enclosure means for providing an environment for the container during said cooling;

(2) cooling means for admitting a cooling medium to said environment to cool the same to an environmental cooling temperature;

(3) support means for supporting the container within the enclosure means;

(4) drive means for the container when supported by the support means; the drive means being arranged, while the cooling means is effective to cool the environment for said cooling, to agitate the container with an acceleration amount which is of sufficient magnitude to cause the cooling to operate in a regime in which the cooling time required for the product to reach a predetermined temperature is reduced by at least about 90% compared to the cooling time required to reach said predetermined temperature at the same environmental cooling temperature but with agitation and moreover is substantially insensitive to increases in the magnitude of the acceleration amount.

11. Apparatus according to claim 9 wherein in order to agitate the container the drive means is arranged to reciprocate the support means in relation to the enclosure means, the enclosure means being stationary.

12. Apparatus according to claim 9 wherein, the enclosure means is mounted for reciprocation, and the enclosure means and the support means are horizontally reciprocable together by the drive means to agitate the container.

13. A process according claim 4, wherein the reciprocation of the containers is substantially horizontal.

14. The apparatus according to claim 11, wherein the reciprocation is horizontal.

15. A process for thermally treating a product in a container, comprising the steps of:
   a) filling a container with a product so as to form a headspace in the container above the product;
   b) placing the container in an environment that is at an environmental temperature, the environmental temperature being different from the temperature of the product filling the container;
   c) reciprocating the filled container in the environment so as to impart an acceleration amount to the container of at least about ¾ g, g being the acceleration due to gravity, so as to thermally treat the product.

16. The process according to claim 15, wherein the headspace is greater than 1 mm.

17. The process according to claim 15, wherein the reciprocating motion is applied with an amplitude of at least about 25 mm peak to peak.

18. The process according to claim 15, wherein the reciprocating motion is applied with an amplitude no greater than about 300 mm peak to peak.

19. The process according to claim 15, wherein the product has a viscosity equivalent to that of a slurry of 5% to 10% bentonite in water.

20. The process according to claim 15, wherein the environmental temperature is above the temperature of the product, whereby the product is heated during the thermal processing.

21. The process according to claim 15, wherein the environmental temperature is below the temperature of the product, whereby the product is cooled during the thermal processing.

22. The process according to claim 15, wherein the thermal treatment further comprises bringing the product to a predetermined temperature, and wherein the acceleration amount is of sufficient magnitude to cause the time required for the product to reach the predetermined temperature to be reduced by at least about 90% compared to the time required for the product to reach the same predetermined temperature in an environment at the same environmental temperature but without reciprocating motion.

23. The process according to claim 15, wherein the product has a viscosity equivalent to that of a slurry of about 5% bentonite in water, and wherein the container is reciprocated so as to impart an acceleration amount in the range of 1 to 2 g.

24. The process according to claim 15, wherein the product has a viscosity in a range equivalent to that of a slurry of about 7% to 8% bentonite in water, and wherein the container is reciprocated so as to impart an acceleration amount of at least about 1¼ g.

25. The process according to claim 24, wherein the container is reciprocated so as to impart an acceleration amount in the range of 1½ to 2½ g.

26. The process according to claim 15, wherein the product has a viscosity equivalent to that of a slurry of about 9% bentonite in water, and wherein the container is reciprocated so as to impart an acceleration amount of at least about 1½ g.

27. The process according to claim 26, wherein the container is reciprocated so as to impart an acceleration amount in the range of 1¾ to 2½ g.

28. The process according to claim 15, wherein the container is subjected to no forms of agitation other than said reciprocation during step (c).

29. A process for thermally treating a product in a container, comprising the steps of:
   a) filling a container with a product so as to form a headspace in the container above the product;
   b) placing the container in an environment that is at an environmental temperature, the environmental temperature being different form the temperature of the product filling the container;
   c) reciprocating the filled container in the environment until the product reaches a predetermined temperature, said reciprocation being applied so as to impart an acceleration amount to the container equal to at least a critical minimum threshold amount, the critical minimum threshold amount being that (i) at which the time required for the product to reach the predetermined temperature is at least about 90% less than the time otherwise required to reach the same temperature without reciprocation and (ii) above which the time required to reach the predetermined temperature drops by no more than one minute for each one g increase in the magnitude of the acceleration amount.

30. The process according to claim 29, wherein the product has a viscosity, and wherein the critical minimum threshold amount depends on the viscosity of the product, with higher viscosities requiring slightly higher critical minimum threshold acceleration amounts.

31. The process according to claim 30, wherein the headspace is greater than 1 mm, wherein the reciprocating motion is substantially sinusoidal and is applied with an amplitude in the range of about 25 to 300 mm peak to peak, wherein the product has a viscosity equivalent to that of a slurry of water and bentonite in the range of about 5% to 10%, and wherein the critical minimum threshold acceleration amount is at least about ¾ g.

32. The process according to claim 31, wherein the reciprocation is applied so as to impart an acceleration amount to the container in the range of 1 g to 2½ g.

33. The process according to claim 29, wherein the container is subjected to no forms of agitation other than said reciprocation during step (c).

* * * * *

UNITED STATES PATENT AND TRADEMARK OFFICE
CERTIFICATE OF CORRECTION

PATENT NO. : 5,857,312
DATED : January 12, 1999
INVENTOR(S) : Walden

It is certified that error appears in the above-identified patent and that said Letters Patent is hereby corrected as shown below:

Title page, item [75] inventor: lines 6-7, delete "Faringdon, United Kingdom" and insert --Faringdon, Oxfordshire, United Kingdom--

Title page, item [30] line 2, delete "9420650" and insert --9420650.5--
Title page, item [56] line 11, delete "NcHenry et al." and insert --McHenry et al.--

Column 2, Line 42, delete "of of 3" and insert - -of 3- - therefor;

Column 9, Line 22, delete "that a acceleration" and insert - -that an acceleration- - therefor;

Column 10, Line 20, delete "subjected to a environment" and insert - - subjected to an environment- - therefor;

Column 10, Line 26, delete "time required reach the" and insert - - time required to reach the- - therefor.

Column 12, Line 31, delete "being different form the" and insert - -being different from the- - therefor.

Signed and Sealed this

Eleventh Day of January, 2000

Attest:

Q. TODD DICKINSON

*Attesting Officer*   *Acting Commissioner of Patents and Trademarks*